Patented Nov. 5, 1929

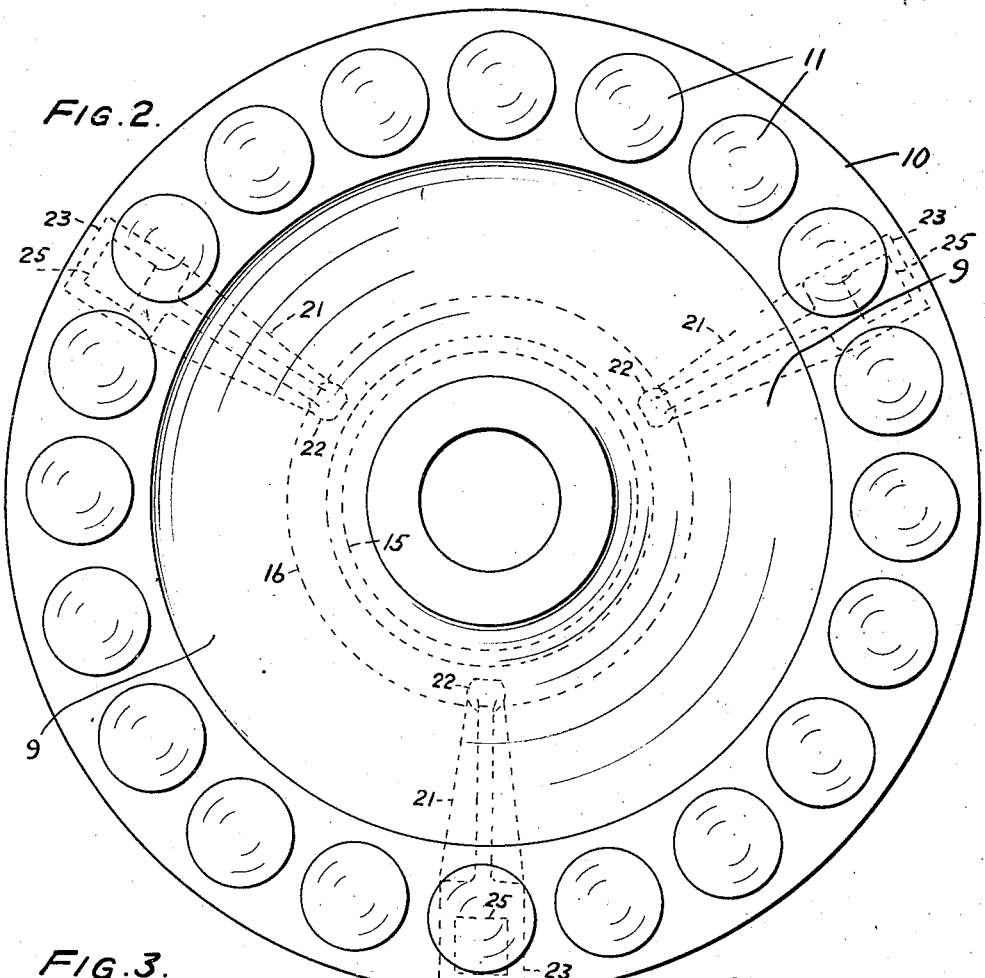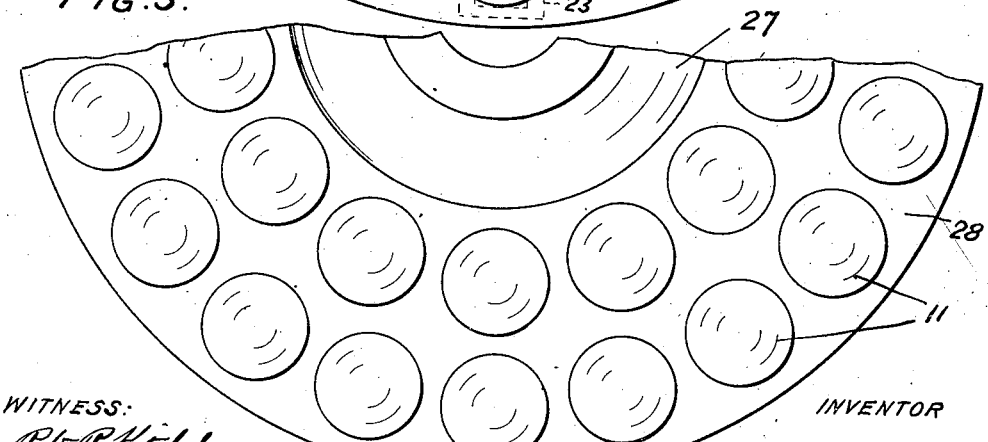

1,734,598

UNITED STATES PATENT OFFICE

HENRY N. SCHRAMM, OF WEST CHESTER, PENNSYLVANIA

POWER-TRANSMITTING FLEXIBLE COUPLING

Application filed April 5, 1927. Serial No. 181,103.

My invention relates to couplings adapted to connect the shafts of driving and driven units and more particularly the shafts of portable outfits such as engine driven air compressors mounted upon wheel bases.

The principal object of my invention is to provide a coupling consisting of two rigid members connected by friction means for the transmisison of power between driving and driven units at all times and at the same time to protect the coupling members as well as the units from being injured by the stresses and strains due to variation of speed, load, vibrations and relative linear and angular displacements.

Heretofore friction couplings such as used to connect the clutch with the engine shaft of an automobile had one of its members made of elastic or yieldable steel. I found that when such a coupling is used to connect the shafts of an engine and air compressor mounted on a wheel base, the stresses and strains to which the coupling is subjected results eventually in the crystallization and final breaking of the yieldable or elastic member.

With the above and related objects in view my invention comprises the construction, combination and arrangement hereinafter more fully described, a preferred embodiment whereof is illustrated in the accompanying drawing and set forth in the accompanying claims, it being understood that various modifications in the construction, arrangement and other details may be made without sacrificing any of the advantages of this invention and to be within the scope of the appended claims.

In the said drawing—

Fig. 2 is a front view of the driven member of the coupling.

Fig. 3 is a front view of a portion of a modified form of a friction member of the coupling.

Figure 1:
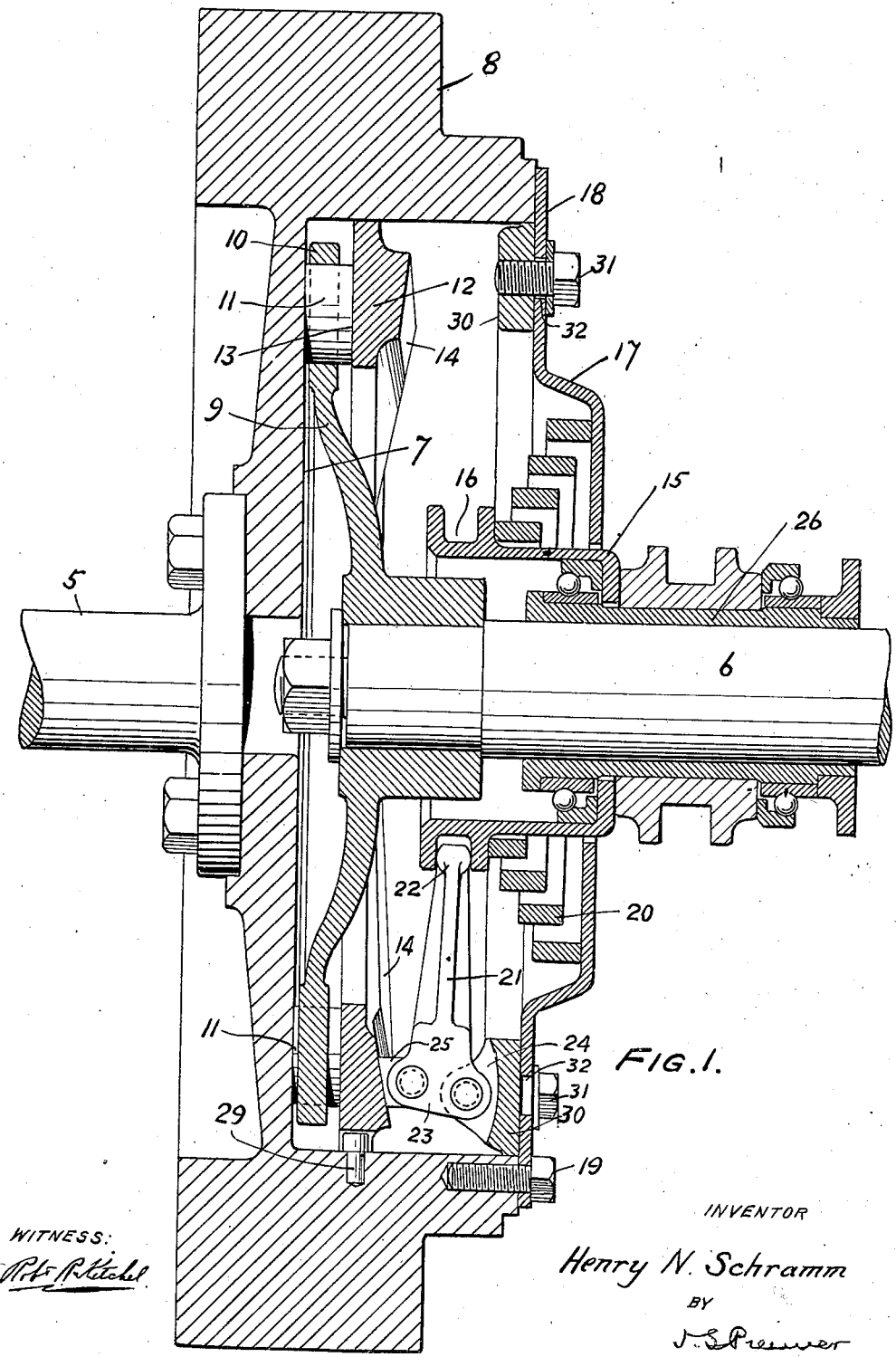
Fig. 1 is a vertical section of my coupling shown in connection with a member of an automobile clutch.

Referring more particularly to the drawing for a detail description of my improved coupling, the driving member of the coupling is shown to be fixedly mounted upon one end of a shaft 5 and the driven member is shown to be similarly mounted upon the adjacent end of a shaft 6. The driving member consists of a disc provided with a plane face 7 concentric with the shaft 5, and with a peripheral flange 8 extending outwardly of the face 7. The driven member of the coupling consists of a plate 9 provided with a rim having a plane face 10 in parallelism with the face 7 of the drive member.

The rim of the plate 9 is provided circumferentially with a circular series of apertures or holes the centres of the holes being equidistant from the centre of the plate. Cylindrical plugs 11 are loosely mounted in the holes of the rim the length of the plugs being such as to project through the opposite faces of the rim.

An annular ring 12 is mounted in the rear of the rim 10 and is provided with a plane face 13 bearing against the plugs to move them into frictional contact with the face 7 of the drive member of the coupling. The face 14 of the ring 12 is made to slope centrally inward and circumferentially in the driving direction from low to high points, dividing the face into three parts 120 degrees apart.

A cup shaped member 15 of a ball bearing for the shaft 6 is provided with a peripheral channel 16. A plate 17 is provided with a rim 18 connected by bolts 19 with the flange 8 of the drive member. The plate 17 is provided with a central opening about the cup 15, the plate being yieldably or flexibly connected with the cup by a coiled bar spring 20, commonly used in connection with an automobile clutch. Three links 21 are mounted circumferentially of the cup 15 120 degrees apart as shown in Fig. 2. Each link is provided with a spherical head 22 within the recess of the channel 16 of the cup and with a foot 23 pivotally connected at one end with the ears of a bracket 24 of a ring 30 inside the flange 8, suspended from the plate 17 by bolts 31, and the opposite end of the foot 23 is pivotally connected with a lug 25 riding upon the sloping surface 14 of the ring 12.

The ball bearing by which the cup shaped member 15 is flexibly connected with the drive member of the coupling is carried by a sleeve 26 mounted upon the driven shaft 6, the bearing being adapted to be fixed upon the shaft when it is operatively connected with the shaft 5 by the spring 20 as shown in the drawing.

The driven member of the coupling shown in Fig. 3 is intended for use in connection with outfits adapted for extra heavy work and comprises a plate 27 provided with a rim 28 adapted to accommodate two circular rows of plugs 11.

To compensate for wear of the plugs 11, the ring 12 is provided peripherally with recesses for the heads of pins, each pin 29 projecting from the flange 8 of the driving member to permit of the ring being moved down to contact with the plugs and thus take up the wear. To move the ring 12, the bracket ring 30 is suspended from the flange 18 of the plate 17 by bolts 31 projected through elongated holes 32 of the flange, which bolts may be loosened by means of the heads and threaded shanks and revolved along the elongated holes until the lugs 25 ride into a higher position of the sloping surface 14 of the ring 12 and tightened to clamp the ring 30 to the flange 18, the ring 12 being prevented from turning by the heads of the pins inside the recesses of the ring 12 which permit the up and down movement of said ring but prevent the ring from turning.

What I claim is:—

1. A coupling including a driving shaft, a driven shaft substantially aligned therewith, a member carried by one of the shafts and provided with apertures extending in the direction of the axis of rotation, friction plugs loosely mounted in the apertures, friction plates mounted to rotate with the other shaft and arranged to contact with the opposite ends of the friction plugs, one of said plates being movable towards and from the other to clamp the friction plugs therebetween, and yielding means normally urging the movable plate towards the other plate to clamp the friction plugs whereby relative movements of the two shafts may occur without disarrangement of the friction plugs relative to the friction plates.

2. A coupling including a driving shaft, a driven shaft substantially aligned therewith, a member carried by one of the shafts and provided with apertures extending in the direction of the axis of rotation, friction plugs loosely mounted in the apertures, friction plates mounted to rotate with the other shaft and arranged to contact with the opposite ends of the friction plugs, one of said plates being movable towards and from the other to clamp the friction plugs therebetween, a casing carried by the last named plate, toggle levers reacting between the casing and movable plate, and a spring acting on the levers to move the movable plate to clamping position whereby relative movements of the two shafts may occur without disarrangement of the friction plugs relative to the friction plates.

In testimony whereof I have attached my signature to this specification.

HENRY N. SCHRAMM.